United States Patent Office

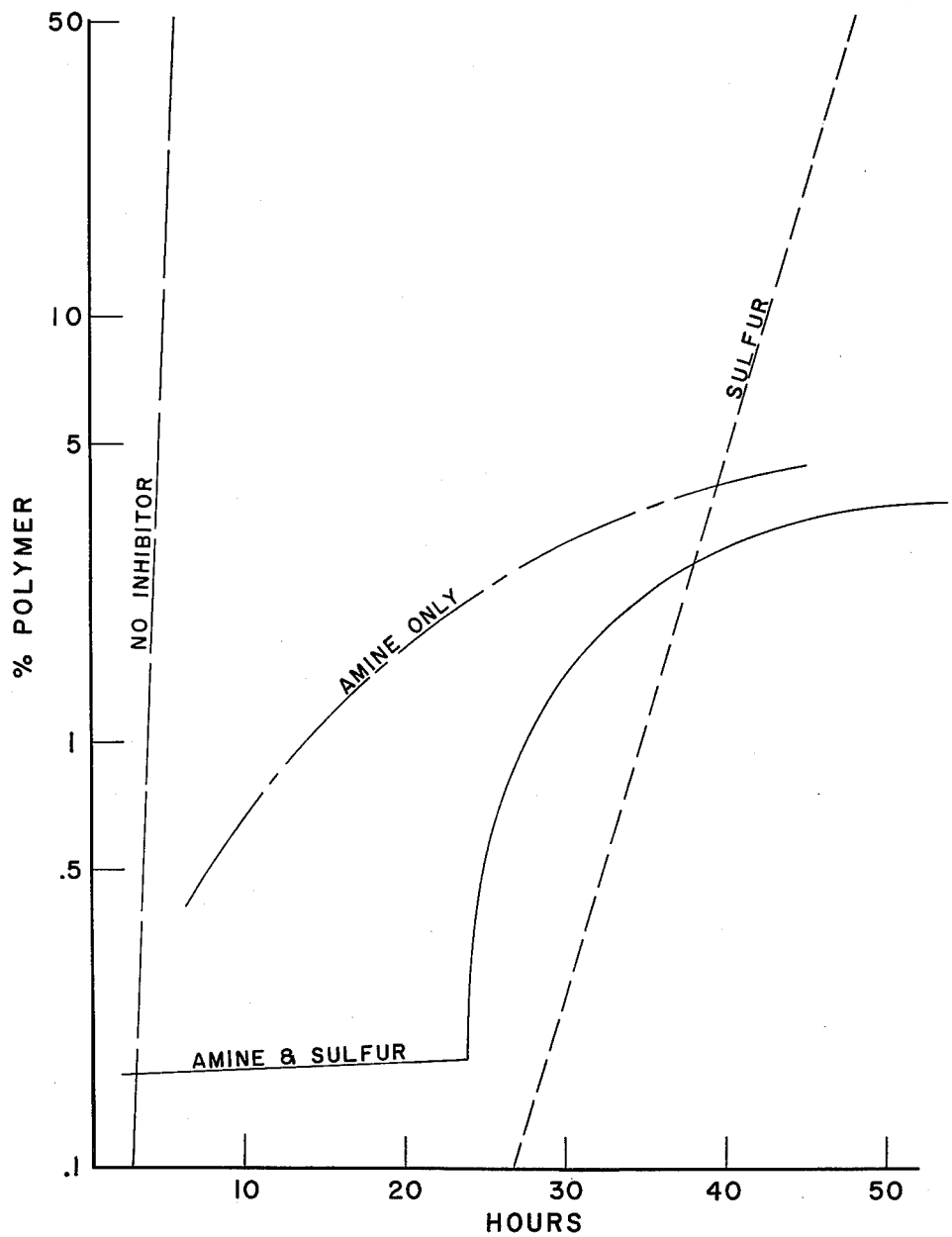

> 3,207,798
> Patented Sept. 21, 1965

3,207,798
STABILIZING VINYL AROMATIC WITH AMINE-SULFUR MIXTURES
Raymond A. Franz, Kirkwood, Mo., assignor to Monsanto Company, a corporation of Delaware
Filed Oct. 31, 1961, Ser. No. 148,903
5 Claims. (Cl. 260—666.5)

The present invention relates to the stabilization of vinyl aromatic compounds. More particularly, the present invention relates to the prevention of polymerization of vinyl aromatic compounds both at normal storage temperature and at the elevated temperatures necessary for distillation and purification of such compounds.

It is well known that vinyl aromatic compounds such as styrene, its homologs and analogs will readily polymerize at elevated temperatures and further will polymerize to a significant extent on standing at ordinary temperatures. Therefore, at the temperatures required to purify vinyl aromatic compounds by distillation, substantial amounts of vinyl aromatic polymers are formed. This polymer formation results in the loss of considerable vinyl aromatic monomers and in plugging of the distillation units and in other such deleterious effects. Further, in the manufacture of polymers from the vinyl aromatic monomers, premature polymerization even to a slight extent may render the monomer unfit for use since it may seriously affect the properties of the final polymeric product. To prevent the premature polymerization of vinyl aromatic compounds, whether in a distillation column or a storage container, inhibitors are added to these compounds. Among the inhibitors suggested by the prior art for the prevention of polymerization in vinyl aromatic compounds are sulfur, N,N-dialkyl hydroxylamines, 1-amino anthraquinone, methyl aniline, m- and p-phenylenediamine, p-nitrosodimethyl aniline, phenyl-1-naphthylamine, etc.

It is now the object of the present invention to provide a new and improved polymerization inhibitor for vinyl aromatic compounds. Another object of the present invention is to provide inhibited monomeric vinyl aromatic compounds. It is the particular object of the present invention to provide a new and improved inhibitor composition for the prevention of the polymerization of vinyl aromatic monomers both at ordinary room temperatures and at the elevated temperatures required for distillation and purification of such compounds. Additional objects will become apparent from the following description of the invention herein disclosed.

In fulfillment of these and other objects, it has been found that the polymerization of vinyl aromatic compounds is effectively inhibited by the addition thereto of a tertiary amine containing 1 to 50 percent by weight of sulfur dissolved and retained therein.

The accompanying figure very graphically illustrates the effectiveness of the novel inhibitor disclosed herein. The figure presents a comparison of the weight percent polymer formed at various times for uninhibited styrene and styrene inhibited with sulfur, a tertiary amine and the novel tertiary amine-sulfur inhibitor of the present invention. In obtaining the data for the figure, four 5.9 gram samples of styrene were obtained. To one of these samples was added 0.01 gram of powdered sulfur. To a second sample was added 4 drops (0.08 gram) of N,N-dimethylethanolamine. To the third sample was added 4 drops (0.08 gram) of an inhibitor prepared by dissolving one gram of powdered sulfur in 19.0 grams of N,N-dimethylethanolamine. The sulfur was dissolved in the amine by heating the mixture at 90° C. for 20 hours. The resulting solution was totally soluble in water and one from which no sulfur precipitated on cooling. The fourth styrene sample was allowed to remain uninhibited. All four samples were placed in an oil bath and maintained at a temperature of 88–89° C. for several hours. During this period the amount of polymer was determined at various time intervals. The amount of polymer on a weight percent basis was plotted against time to obtain the graphical presentation of the accompanying figure.

From the graph presented in the accompanying figure, it is readily apparent that significantly improved results are obtained from the use of the herein disclosed inhibitor over either a tertiary amine or sulfur alone. The mechanism of the present inhibitor is not fully understood at present. It is not known whether the remarkable superiority of the inhibitor is a synergistic effect or whether it is the result of the formation of an entirely new composition which is not a mixture of sulfur and an amine but rather a new compound. For the reasons hereinafter set out, it is believed that the latter is the case.

The novel inhibitor compositions of the present invention are prepared by heating a tertiary amine and sulfur mixture to a temperature at which all of the sulfur will dissolve in the amine such that on cooling of the resulting solution the sulfur does not precipitate to any extent. That sulfur may be dissolved in an amine without the novel inhibitor disclosed herein being formed has been determined by experimentation. One gram of sulfur was mixed with 19.0 grams of dimethylethanolamine and heated at 80° C. for approximately 16 hours. On cooling, virtually all of the sulfur precipitated from the solution. However, a mixture of the same ingredients in the same proportions heated to 90° C. for 20 hours formed a solution from which sulfur did not precipitate on cooling. Therefore, it is apparent that the novel inhibitor composition disclosed herein is not truly a mixture of sulfur and a tertiary amine but rather is apparently a chemical combination. In further support of the theory that a chemical combination results from the proper heating of sulfur and a tertiary amine, it was noted that the inhibitor solution prepared according to the present invention had a considerably darker color than the amine or the amine sulfur solution which separated on cooling. Also, it was noted that when the temperature reaches a certain point in the heating of the amine sulfur mixture, it becomes somewhat autonomous indicating the presence of an exothermic chemical reaction. A consideration of the normal solubility of sulfur in tertiary amines will also suffice to add substantial strength to the theory of a new chemical composition.

The precise temperature at which the sulfur and tertiary amine form the novel inhibitor of the present invention, hereinafter referred to as the combination temperature will vary according to the tertiary amine and the amount of sulfur used. Generally, this temperature will be above 85° C. The combination temperature for any particular tertiary amine and given quantity of sulfur may be determined by the simple expedient of heating the amine-sulfur mixture until solution occurs and then cooling. If sulfur precipitates to any extent, it will be necessary to reheat the mixture to a new and higher temperature and once more cool the solution. In many instances, if the temperature is carefully applied, a sharp and rather sudden rise in temperature may be noted when the combination temperature is reached. Other methods for determining the combination temperature may present themselves to those skilled in the art and are within the spirit and scope of the present invention. Generally, these combination temperatures will not be below 85° C. In those instances in which the boiling point of the tertiary amine is such that significant loss of amine will occur at the combination temperature, pressure may be applied to the mixture. The effect of pressure on the heating of the amine-sulfur mixture to the combination temperature is negligible, there being no significant change in the combination temperature.

As previously stated the exact form of the novel inhibitor disclosed herein is presently unknown. It is possibly a mixture or more probably, a new chemical compound. Therefore, it is to be understood that the choice of terms used herein, whether implying a mixture or a new compound, are not to be considered as limiting of the present invention.

The amount of sulfur to be added to the tertiary amine to prepare the novel inhibitors of the present invention may vary within a relatively wide range. The amount of sulfur will seldom be less than 1 percent by weight of the inhibitor nor greater than 50 percent by weight. The amount of sulfur will vary with the amine with which it is combined. Optimum amounts of sulfur will also vary with the particular compound which is to be inhibited by the amine sulfur inhibitor. Generally, the most desirable amount of sulfur is the maximum amount which will go into solution at the particular solubilizing temperature and will then remain in solution on cooling of the mixture. The preferred amount of sulfur to be used with the preferred tertiary amines hereinafter disclosed is 1 to 30 percent by weight. The sulfur used may be in any of the forms in which sulfur may be obtained, e.g., molten or powdered.

The amines with which the sulfur is mixed in providing the novel inhibitors disclosed herein are tertiary amines. Non-limiting examples of tertiary amines are tert.-alkanol amines, tert.-alkyl amines, N-substituted pyridines, N-alkyl piperidines, N-alkyl morpholines, N,N-alkyl dialkanol amines, N,N-dialkyl alkanol amines, etc. The tertiary amines which are preferred for the purpose of the present invention are the N,N-dialkyl alkanolamines. The alkyl groups and the alkanol group may be straight or branched chain. Several non-limiting examples of such amines are N,N-dimethyl ethanolamine, N,N-diethyl ethanolamine, N,N-dipropyl pentanolamine, N,N-diethyl-4-hexanolamine, N,N-2- methyl hexyl-2-ethyl pentyl isopropanolamine, etc. The tertiary amines which are particularly preferred in the present invention are the N,N-dialkyl alkanolamines in which the alkyl groups and the alkanol group contain 1 to 4 and 1 to 3 carbon atoms respectively.

In choosing a particular amine for combination with sulfur in the present invention, consideration should be given to the possibility of separation of the inhibitor and the inhibited compound. For example, if styrene is to be inhibited, then an amine should be chosen having a substantially similar boiling point to that of styrene, thereby preventing the separation of inhibitor and styrene by distillation. This consideraion is not intended to be in any way limiting of the scope of the present invention but is directed only to its more practical application.

The amount of the herein disclosed inhibitor which is to be added to the vinyl aromatic compounds in accordance with the present invention will vary upon the application to which the inhibitor is put. If the inhibitor is to be used for the prevention of polymerization at ordinary storage temperatures and under normal storage conditions, only small amounts are necessary. At little as five parts of inhibitor per million parts of the vinyl aromatic monomer is effective in preventing polymerization. At higher temperatures such as those required for distillation of vinyl aromatic compounds, larger quantities of inhibitor are needed. Very seldom will the quantity of inhibitor be greater than 5 percent by weight, however. Therefore, for all utilities it may be stated that the amount of inhibitor will be within 0.0005 to 5 percent by weight. However, more preferred in most applications of the present invention are inhibitor concentrations of 0.01 to 2 percent by weight. It is to be understood that these are practical ranges rather than necessary ranges. The addition of greater than 5 percent does not render the inhibitor inoperable in preventing polymerization but above this number any further gain in effectiveness of the inhibitor will generally be negligible. Seldom will even as great as 5 percent be necessary to adequately inhibit the polymerization of vinyl aromatic hydrocarbons.

When the novel inhibitors of the present invention are present in very low concentrations, such as when used as storage inhibitors, it is in many cases unnecessary to remove them prior to utilization of the vinyl aromatic compounds in their particular utilities. When it is desired to remove the inhibitor, it can generally be done very readily merely by scrubbing the monomer with water or a dilute acid.

The presently disclosed inhibitors are effective with compounds containing ethylenic unsaturation in the side-chain. They are particularly effective with such vinyl aromatic compounds as styrene, alpha-methyl styrene, ring methylated styrenes and ring chlorinated styrenes, divinylbenzene, ethylvinylbenzene, vinylnaphthalene and the like.

What is claimed is:

1. A composition comprising a monomeric vinyl aromatic compound containing an amount of an inhibitor consisting essentially of an N,N-dialkyl alkanol amine in which the alkyl groups contain 1 to 4 carbon atoms and the alkanol group contains 1 to 3 carbon atoms, containing 1 to 50 percent by weight of elemental sulfur dissolved therein, said inhibitor prepared by dissolving said elemental sulfur in said amine at a temperature such that on cooling said sulfur remains dissolved in said amine, said amount of inhibitor being sufficient to prevent polymerization of said vinyl aromatic compound.

2. The composition of claim 1 wherein the N,N-dialkyl alkanol amine is N,N-dimethyl ethanolamine.

3. The composition of claim 1 wherein the amount of elemental sulfur is 1 to 20 percent by weight.

4. The composition of claim 1 wherein the monomeric vinyl aromatic compound is styrene.

5. The method of preparing a composition for the prevention of the polymerization of vinyl aromatic compounds which comprises mixing an amount of elemental sulfur with a N,N-dialkyl alkanol amine such as to produce an elemental sulfur concentration of 1 to 50 percent by weight of the mixture and then heating said mixture to a temperature of above 85 degrees at which temperature all of the elemental sulfur is dissolved in said amine and a solution formed which when on cooling will retain said elemental sulfur dissolved therein, said N,N-dialkyl alkanol amine being one in which the alkyl group contains 1 to 4 carbon atoms and the alkanol group contains 1 to 3 carbon atoms.

References Cited by the Examiner

UNITED STATES PATENTS

| | | | |
|---|---|---|---|
| 2,064,571 | 12/36 | Smith | 202—57.1 |
| 2,240,764 | 5/41 | Dreisbach et al. | 202—57.1 |
| 2,407,861 | 9/46 | Wolk | 202—57.1 |
| 2,510,847 | 6/50 | Wilson | 202—57.1 |
| 2,757,130 | 7/56 | Burns | 260—666.5 |
| 2,965,685 | 12/60 | Campbell | 260—666.5 |
| 2,980,599 | 4/61 | Morse | 260—666.5 |

ALPHONSO D. SULLIVAN, *Primary Examiner.*